United States Patent
Freeman (10) Patent No.: US 7,420,592 B2
(45) Date of Patent: Sep. 2, 2008

(54) IMAGE SHIFTING APPARATUS FOR ENHANCED IMAGE RESOLUTION

(75) Inventor: Philip L. Freeman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 10/870,604

(22) Filed: Jun. 17, 2004

(65) Prior Publication Data
US 2005/0280714 A1  Dec. 22, 2005

(51) Int. Cl.
H04N 5/225 (2006.01)
H04N 5/228 (2006.01)
H04N 5/208 (2006.01)
H04N 3/14 (2006.01)

(52) U.S. Cl. ............... 348/219.1; 348/222.1; 348/252; 348/294

(58) Field of Classification Search ............... 348/219.1
See application file for complete search history.

(56) References Cited

U.S. PATENT DOCUMENTS

| | | | | |
|---|---|---|---|---|
| 3,532,043 A * | 10/1970 | Shimomura et al. | ............ | 396/63 |
| 4,220,972 A * | 9/1980 | Geokezas et al. | ............ | 348/573 |
| 5,444,481 A * | 8/1995 | Ohshima et al. | ............ | 348/187 |
| 5,557,327 A * | 9/1996 | Hasegawa et al. | ............ | 348/340 |
| 5,838,371 A * | 11/1998 | Hirose et al. | ............ | 348/240.2 |
| 5,889,553 A * | 3/1999 | Kino et al. | ............ | 348/218.1 |
| 5,926,216 A * | 7/1999 | Nobuoka | ............ | 348/297 |
| 6,078,751 A | 6/2000 | Yamazaki et al. | | |
| 6,208,377 B1 | 3/2001 | Morofuji et al. | | |
| 6,282,376 B1 | 8/2001 | Shiomi | | |
| 6,473,120 B2 * | 10/2002 | Hirasawa et al. | ......... | 348/208.1 |
| 6,606,456 B2 | 8/2003 | Fujinaga | | |
| 6,618,197 B1 | 9/2003 | Hayakawa | | |
| 7,095,434 B1 * | 8/2006 | Ikeda | ............ | 348/219.1 |
| 2002/0047906 A1 * | 4/2002 | Ohta | ............ | 348/208 |

OTHER PUBLICATIONS

Image Stabilizer webpage (2 pages), Canon [online] (projected publication date Apr. 2004).
Pickup, et al., "A Sampled Texture Prior for Image Super-Resolution" [online] (projected publication date 2003).

* cited by examiner

*Primary Examiner*—David Ometz
*Assistant Examiner*—Wanda M Negron
(74) *Attorney, Agent, or Firm*—Wildman, Harrold, Allen & Dixon, LLP

(57) ABSTRACT

An image shifting apparatus may capture multiple frames of an image, with each frame offset by a sub-pixel offset distance. After capture, the various sub-pixel offset images may be registered together and analyzed using known resolution enhancement algorithms. Super resolution algorithms, for example. may take the various frames and perform edge identification and peak extraction routines to improve the resolution of high frequency data within an image. The image shifting apparatus may include an actuation controlled optical compensator within the imaging system that may be adjusted to create a sub-pixel offset image of an original reference image. The optical compensator may be an image-stabilizing element, for example, capable of forming sub-pixel shifts in an image plane.

12 Claims, 7 Drawing Sheets

IMAGE SHIFTING APPARATUS FOR ENHANCED IMAGE RESOLUTION

FIELD OF THE INVENTION

The present invention relates generally to imaging systems and more particularly to enhanced resolution imaging systems.

BACKGROUND OF THE RELATED ART

Technology to improve imaging has been integrated into increasing numbers of applications recently. The technology takes shape in a variety of forms across these applications, with some imaging technology being implemented via computer software and other imaging technology resulting from the physical optics used. In digital camera technology, for example, optical lenses with reduced chromatic aberration and reduced focusing errors are used to improve image quality. Image sensors with high pixel counts are used to offer better image resolution and capture more detail within an image. In military applications, imaging systems are used for guidance systems to help identify objects from often times great distances and limited visibility. In manufacturing applications, computer imaging technology is used as part of a machine vision system, for example, where part machining is automated based on images recorded during tooling.

Although relatively effective in certain applications, imaging technology is limited. One notable limitation occurs in digital imaging systems, which are sorely limited by pixel size and count. Take for example consumer applications, e.g., consumer quality digital cameras where sizeable increases in digital camera pixel count have occurred recently. Yet, these increases are not sufficient enough to use in high deemed imaging systems, especially those that would be called upon to produce small scale structures, such as those with micron sized features.

Machine vision technology, used to image many small-scale structures, requires very high resolution imaging. But limitations in the photodetector or CCD camera used for imaging limit that resolution, even when the optics used are capable of higher resolution. With resolutions higher than those used today, manufacturers could produce smaller, more intricate structures, and manufacturers would be able to more easily identify device defects.

One limitation in machine vision technology is with the requirement of a quantization of the physical space occupied by the machined component—navigated by the tooling machine—to a pixel grid on an image sensor. If the pixel grid on the image sensor is not appropriately mapped to the physical space of the image or the machine tool, then errors will occur. For example, an edge of the tooled component might overlap a number of pixels in the pixel grid of the image sensor, thereby making exact edge resolution difficult. Thus, although ideally a device's edge would match up perfectly on a row or column of pixels, mapping of the pixel grid to the tooled component is not that exact. The edge of the component may cast an image over a number of adjacent pixels, each responding slightly different to the amount of light impending upon it. This phenomena of poor mapping could limit a microprocessor's ability to resolve the image cast on those pixels to determine the exact position of the tool in the physical space—the machine vision system measures light data on the pixel grid to guide machine tooling in the physical space.

To improve pixel resolution in imaging systems, resolution enhancing techniques have been developed. Super resolution techniques overcome some of the pixel resolution problems by comparing numerous lower resolution images to one another and then statistically developing a higher resolution image from these lower resolution ones. The lower resolution images are all slightly offset from one another and then compared to one another. Super resolution techniques interpret grayscale patterns of an image by comparing these slightly shifted lower resolution images.

In application, super resolution techniques use cameras to capture a sequence of frames of known sub-pixel shift from a reference image. These frames are registered, that is, analyzed by removing the image shift. Then the registered images are compared to derive edge statistical data, which is used to derive a sharper, higher resolution edge.

Although super resolution techniques can offer some image enhancement, there are drawbacks to these techniques that prevent them from widespread use. One, it is quite difficult and time-consuming to capture sub-pixel shifted frames. Expensive translation stages that can be adjusted a sub-pixel amount are used to shift the component being imaged. For example, the component is mounted to the translation stage and the stages are moved by small amounts as the sub-pixel shifted frames are captured. These stages must have both X-translation mechanisms and Y-translation mechanisms. The translation stages may be required to bear varying loads and have different inertial masses that must be overcome prior to movement the stage. Two, the size of these translation stages limits the extent to which a compact super resolution device can be made.

The applicants have found that it is desirable to have a technique improving resolution of an image, for example, to allow for super resolution, and do so in a faster, more cost effective manner.

SUMMARY OF THE INVENTION

An embodiment of the present invention is an apparatus for producing an enhanced resolution image, the apparatus comprising an image sensor having a pixel array; at least one optical element positioned to form an image at a first pixel position on the pixel array; an optical compensator movable between a first position wherein the image is at the first pixel position and a second position wherein the image is at a second pixel position on the pixel array offset from the first pixel position by a sub-pixel offset; and an actuator for moving the optical compensator between the first position and second position in response to a sub-pixel offset signal.

Another embodiment of the present invention is an article comprising a machine-accessible medium having stored thereon instructions that, when executed by a machine, cause the machine to capture a first image at a first pixel position; provide a sub-pixel offset signal to an optical compensator; move the optical compensator to form at least one additional image at a second pixel position offset from the first pixel position by a sub-pixel offset distance; capture the at least one additional image; compare the first image to the at least one additional image; and in response to a comparison of the first image and the at least one additional image, derive an enhanced resolution image.

Another embodiment of the present invention is a method of enhancing resolution of an image, the method comprising providing a photodetector; capturing a first image at a first pixel position on the photodetector; providing a sub-pixel offset signal to an optical compensator; moving the optical compensator to form at least one additional image at a second pixel position offset from the first pixel position by a sub-pixel offset distance; capturing the at least one additional image; comparing the first image to the at least one additional image; and in response to the comparison of the first image and the at least one additional image, deriving an enhanced resolution image.

In some examples, an image enhancement system that includes an adjustable optical compensator to effect sub-pixel shifts of an image at an image plane may be used to improve resolution of the image. By forming a number of sub-pixel shifted images, image enhancing techniques such as super resolution may be used to form images of greater resolution. The enhanced resolution system may be a stand-alone system or it may be part of or integrated with an image processing system, such as a machine vision manufacturing system. Other examples will be known. Furthermore, although, systems are described in the context of image resolution enhancement, the techniques described may be used to form sub-pixel shifted images for other purposes or where an actual enhancement of an image is not desired or not useful. The techniques may be used to align images at an image plane. The techniques may be used to blur images. The techniques are described below with respect to certain examples, but are not limited thereto.

The features, functions, and advantages can be achieved independently in various embodiments of the present inventions or may be combined in yet other embodiments.

DESCRIPTION OF DETAILED EXAMPLES

Numerous apparatuses for producing enhanced resolution images, e.g., images with resolutions greater than the pixel limits of the detector, are provided below. Generally, these apparatuses include structures for producing various sub-pixel shifted versions of an lower resolution image by taking snapshots, also termed frames, of the shifted images and comparing them to one another. Apparatuses may achieve sub-pixel shifts in an image by adjustment of an optical element positioned in the imaging optics of the system, instead of adjusting the physical position of the object at the object plane. Because the described examples may include controllers and actuators for achieving sub-pixel adjustment of an optical element, the shortcomings of the prior art adjustment techniques (e.g., relying solely upon translation stages) may be reduced by making it possible to improve image acquisition time, by offering better control over sub-pixel movement. The apparatus may also offer reduced cost and greater scalability, so that portable image resolution devices may be provided. The apparatuses may also allow for compensation of environmental conditions such as lens movement, or shape, or other factors that may influence alignment of optical elements.

While the apparatuses are described in reference to some example implementations and applications, persons of ordinary skill in the art will appreciate that the disclosed teachings may be used in a number of implementations and any number of applications, for example, the image resolution enhancing apparatus may be used in a more complex machine vision based metrology system, where a higher resolution image of a machined component is helpful in providing further machining instructions to an assembly process. The techniques may also be used in a more consumer-level applications, such as digital cameras. Furthermore, while some examples are described with reference to the modification and use of existing image stabilizing technology, these descriptions are provided by way of example. Other sub-pixel adjustable optical elements may be used to provide the sub-pixel offset images, i.e., frames, for enhanced image resolution.

Figure 1:
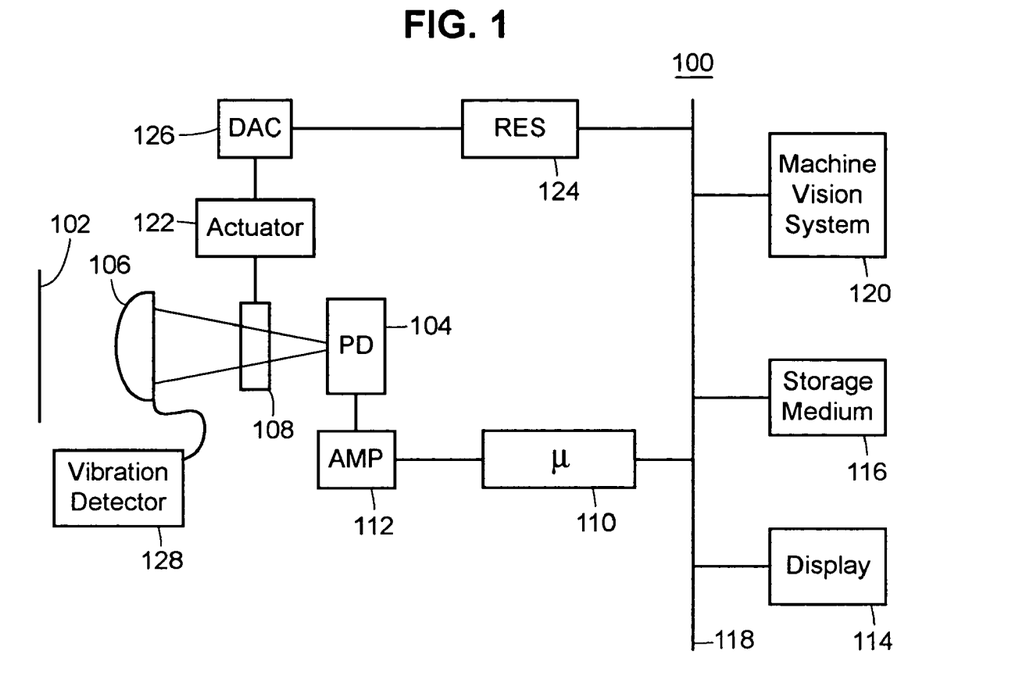
FIG. 1 illustrates an example system for enhancing the resolution of an image, the system having an optical compensator in a first position.

FIG. 1 illustrates an example image enhancement system 100 in which an image 102 is imaged onto a photodetector 104 positioned at an image plane. In the illustrated example, a first optical element group 106 is positioned to capture image data from the image 102 and couple that captured image data into an optical compensator 108. The optical element group 106 is illustrated by example and may represent a collection of optical elements. Additionally, the optical compensator 108, which is described in further detail below, may be used to create sub-pixel shifts of the image data at the photodetector 104. In another example, the optical compensator 108 may be positioned between the optical element group 106 and the image 102.

The photodetector 104, which may be a CCD camera, CMOS image sensor, or other image sensor having a pixel array, is coupled to an image microprocessor 110. The output from the pixel array of the photodetector 104 is provided to the microprocessor 110 for image processing, image data analysis, and/or deriving system control data. Persons of ordinary skill in the art will appreciate that the connection between the photodetector 104 and the microprocessor 110 is illustrated by way of example and may include additional control elements such as filters, signal processors and as illustrated, an optional amplification stage 112. The microprocessor 110 may be used not only for signal processing of the image data recorded at the photodetector 104, but may also provide image data to various subsystems such as a display 114 or storage device 116 (e.g., a hard drive, hard disk, CD ROM, DVD ROM, flash memory, or other readable and/or writable storage media). Both the display 114 and the storage media 116 are coupled to the microprocessor via a processor bus 118, in the illustrated example. Furthermore, the microprocessor 110 may provide captured image data to a machine vision system generally shown by reference numeral 120, which may use captured image data in automated machining and fabrication systems.

The optical element 108 may be angularly and/or linearly adjustable to shift the position of the image data appearing at the photodetector 104. In the illustrated example, the optical element 108 is coupled to (e.g., mounted in) an actuator 122 which may control element movement based upon control signals from a resolution enhancement system (RES) 124, which may be a microprocessor-based system with an accessible storage medium, such as a cache memory, RAM, ROM or other memory storage. In the illustrated example, the system 124 is coupled to the bus 118 and may receive data from the microprocessor 110, the storage medium 116, or other devices coupled to the bus 118. The image resolution enhancement system 124 may execute algorithms that perform a super resolution enhancement on an image. For example, the system 124 may produce a pixel offset signal and provide that signal to a digital-to-analog (DAC) converter 126, which may then provide that signal to the actuator 122 for adjusting the position of the optical compensator 108. That adjustment may result in a sub-pixel offset shift in the image formed at the photodetector 104. Example sub-pixel offset amounts include 1/10 of one pixel shifts in the image formed at the photodetector 104, as well as smaller movements, such as 1/100 of one pixel and smaller movements. In other words, the system 124 may be collaborated to provide control signals to the actuator 122 causing that actuator to move the optical compensator 108 a sufficient distance to achieve a desired sub-pixel offset, where that offset may be based on the sizes of the pixels in the pixel array of photodetector 104. In addition to providing control signals, in an example, the actuator 122 may also measure the position of the compensator 108 and provide that data to the system 124.

The actuator 122 may be an electromechanical actuator, for example, one having a motorized rotatable shaft or translation stage coupled to move the optical compensator 108. Alternatively, the actuator 122 may be an electrostatic or electrothermic actuator responsive to control via the processor system 124. For example, in response to control signals from the system 124, an electric field or a change in thermal heating, respectively, may be applied to an actuator to move the compensator 108. Piezoelectric actuators may also be used, for example, actuators that provide multi-axis tip and tilt platforms and/or a z-axis movement. Some example piezoelectric actuators may provide micron sized movements along the z-axis and mrad deflections for tip/tilt movement, under drive voltage control. Actuations with high bandwidth and precision movement control may allow for finer sub-pixel offset movements and higher system stability, as desired. Open loop and closed loop control systems are contemplated for actuator control and operation.

Additionally, the system 124 may receive image data from the photodetector 104 and position data from the optical compensator 108 directly, via the actuator 122, or via other alternative ways. As explained in further detail below, the system 124 may determine if additional sub-pixel offsets are to be achieved so that additional sub-pixel offset images may be recorded by the photodetector 104. The photodetector may have a digital shutter controlled by the processor 110 to capture a reference image and any additional sub-pixel offset images that are formed. The timing of the digital shutter may be synchronized to the control signals sent to the actuator 122 from the microprocessor 110 or by the system 124. Image capture may also occur in response to the position of the optical compensator 108. Although a digital shutter is described, alternatively a mechanical shutter (not shown) may be used under control of the system 100 or the photodetector 104 may be responsive without a shutter, allowing the processor 110 to effect image capture.

As illustrated, in some alternative examples, an optional vibration detector 128 may be coupled to optical element 106 to detect any shifting movement thereof. Example vibration detectors will be known to persons of ordinary skill in the art and include rate gyro detectors. With the vibration detector 128, if the optical element 106 is moved during image capture, that data may be provided to microprocessor 110 which may derive a position adjustment signal for the system 124 such that the control signals or sub-pixel offset signals provided to the actuator from system 124 include compensation information from the vibration detector 128.

In some examples, the system 124 may determine that either no adjustment, less adjustment, or greater adjustment to the signal for the actuator 122 is warranted. Although the vibration detector 128 is illustrated as coupled to only the optical element group 106, alternatively the detector 128 may be coupled to the optical compensator 108 to determine whether it has moved. Or, the detector 128 may be coupled to detected movement in both the group 106 and the compensator 108.

Other examples to the structures shown in FIG. 1 may become apparent to persons of ordinary skill in the art. For example, although two different processors or processor systems are shown, 110 and 124, in fact, a single microprocessor may be used to execute all the features of the individual processors described herein.

Figure 2:
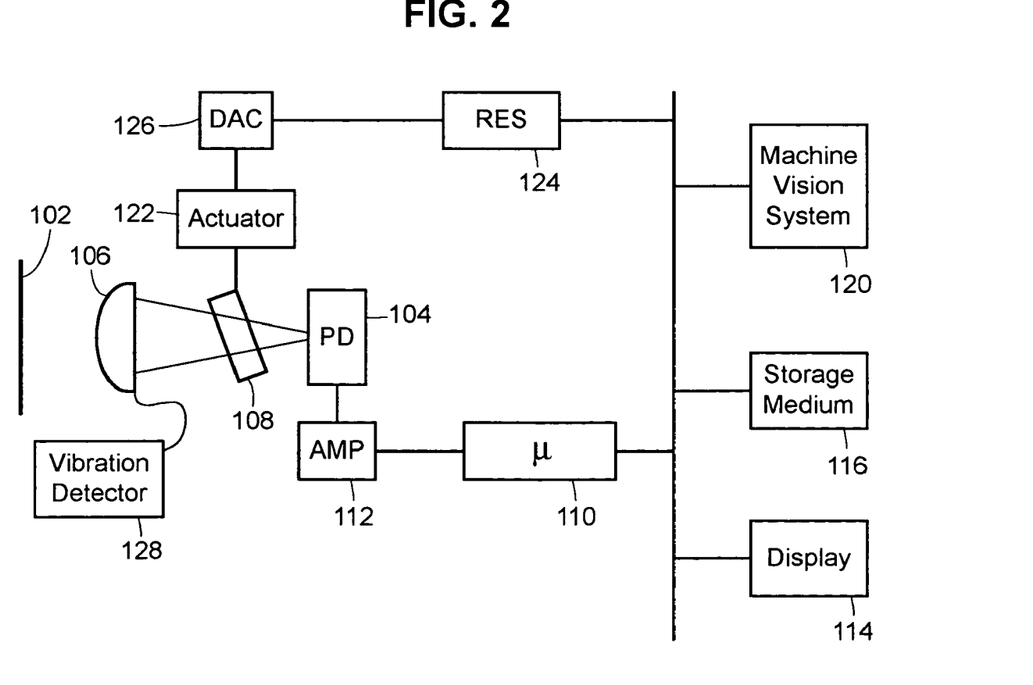
FIG. 2 illustrates the system of FIG. 1 having an optical compensator in a second position.

FIG. 2 illustrates the system 100 after the system 124 has provided a sub-pixel offset signal to the actuator 122 to adjust the position of the optical element 108. In the illustrated example, the optical element 108 has been tilted an amount which creates a shift in the position of the image data at the object plane of the photodetector 104. A large shift is illustrated for explanation purposes. In fact, traditionally sub-pixel shifts would be used.

Figure 3A:
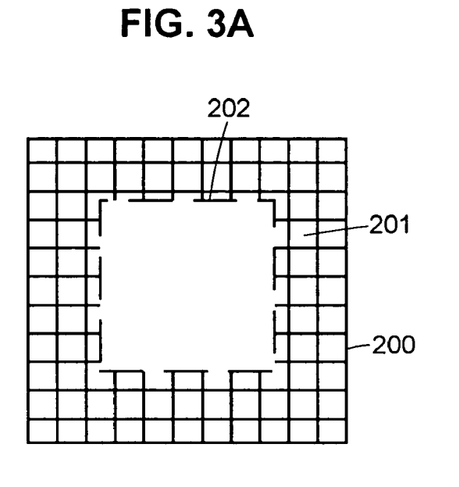
FIG. 3A illustrates an example pixel array of a photodetector with an image in a first position on the pixel array.
Figure 3B:
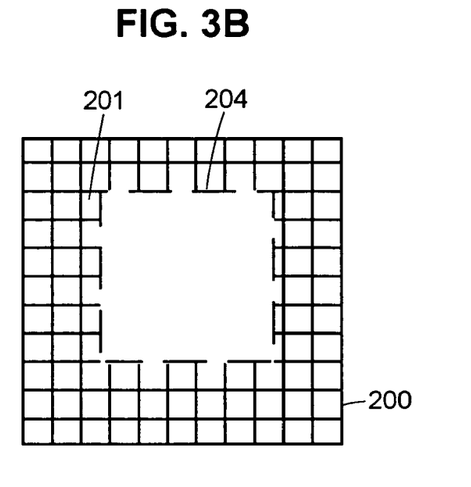
FIGS. 3B-3D illustrate the pixel array of FIG. 3A with an image at various other positions on the pixel array, where the various other positions are sub-pixel offset positions from that illustrated in FIG. 3A.
Figure 3C:
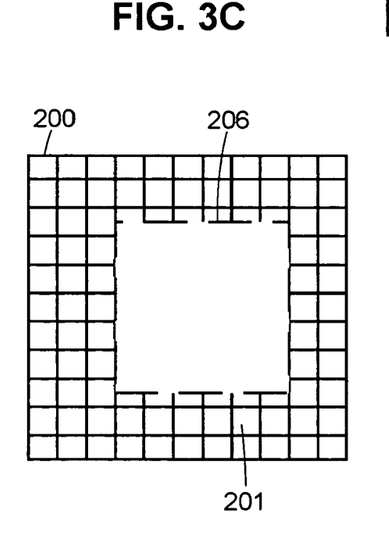

FIGS. 3A-3D illustrated example positions of an image on a pixel array 200 of the photodetector 104, comprising an array of pixels 201 (only some being numbered in the illustration). FIG. 3A illustrates an example reference position 202 of the image data on the pixel array 200. The system 100 may capture the image data at the position 202 and store that image data as reference image data. FIG. 3B illustrates a shift of the image data from position 202 to position 204 representing a sub-pixel shift in a +Y-direction. To achieve this shift, the RES 124 may supply a sub-pixel offset signal to the actuator 122 to move optical compensator 108 the desired sub-pixel Y offset. The offset illustrated is by way of example and may be any desired sub-pixel offset such as a 1/10 or 1/100 of a pixel shift in the Y-direction. Similarly, FIG. 3C illustrates a third position wherein the image data has been shifted from reference position 202 in a sub-pixel X-direction movement to a new position 206, from which the system 100 may capture the image data at the position 206 and provide that captured data to the RES 124 for image resolution enhancement.

Figure 3D:
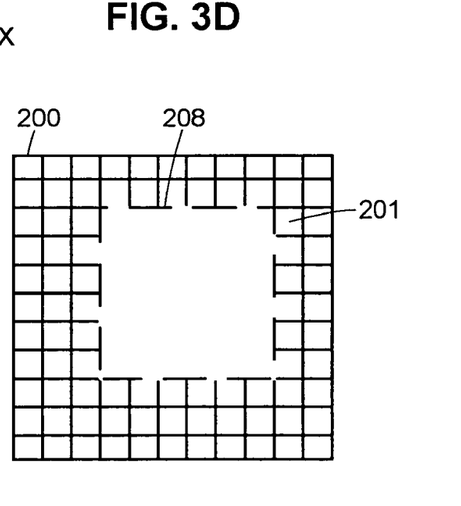

The illustrated movements of FIGS. 3B and 3C are by way of example, as other movements may be achieved. The optical compensator 108 may be moved to form any desired directional shift at the pixel area 200. For example, FIG. 3D shows a sub-pixel movement of image data from reference position 202 to a position 208 representing a sub-pixel shift in both the X and the Y-direction. For any of these examples, although sub-pixel shifts are illustrated and described, the system may also move the optical compensator 108 to achieve pixel or greater offsets, for example, when calibrating the system 100.

Figure 4:
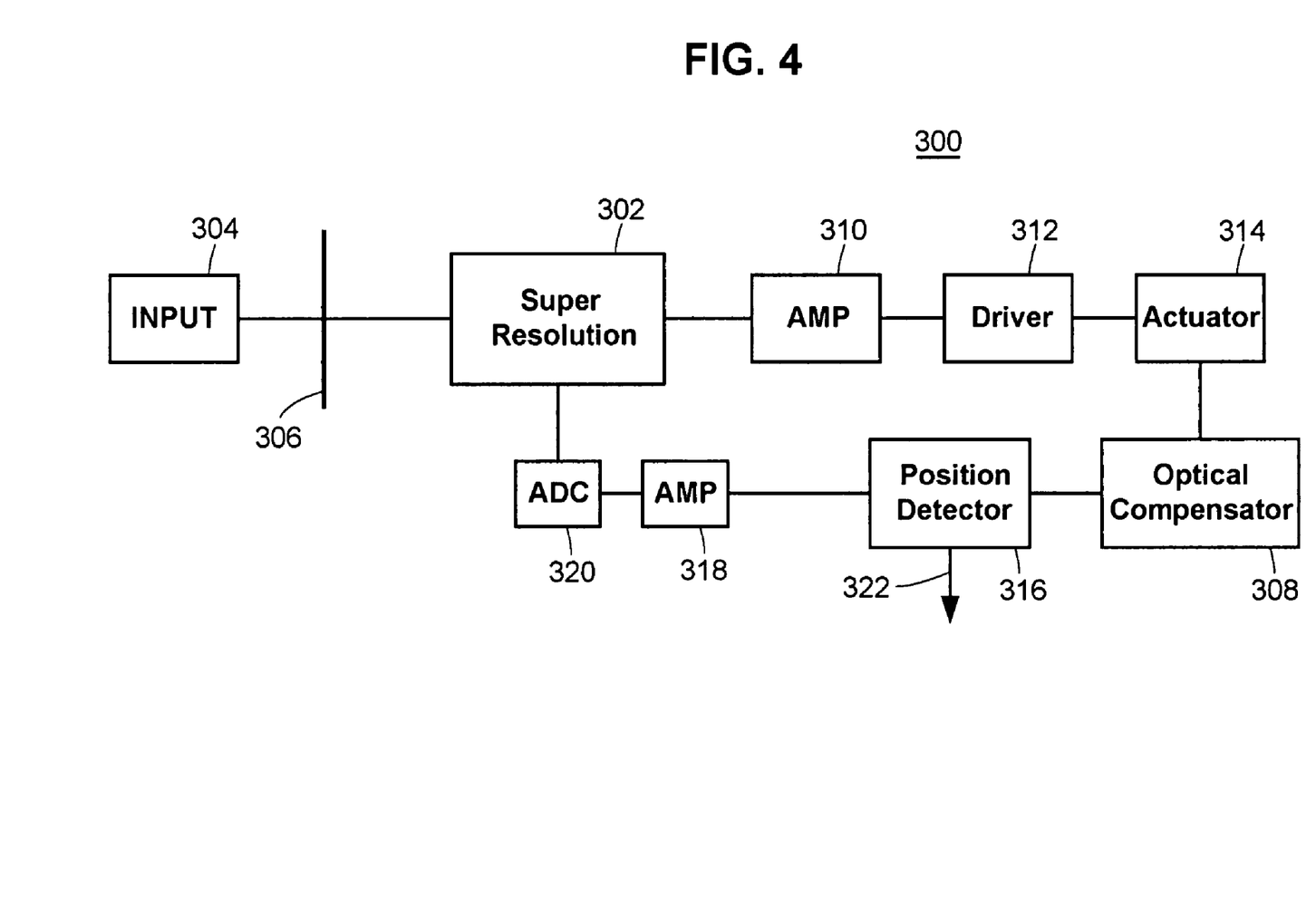
FIG. 4 illustrates an example enhanced resolution control system for an optical compensator.

FIG. 4 illustrates an example implementation of an optical compensator control that includes a feedback loop that supplies position data to a resolution enhancement system. The system 300 includes a resolution enhancement system 302, which is a processor executing super resolution routines in the illustrated example. The SR processor 302 receives input data from an input device 304 connected to a microprocessor bus 306 using known techniques. The input device 304 may be a keyboard, a keypad or other similar input device. Alternatively, the input device 304 may be a computer or other processor coupled to processor 302. Furthermore, while the input device is shown as hardwired, a wireless coupling may be used instead or in addition. In any event, the microprocessor 302 may create sub-pixel position offset and position adjustment signals for controlling the position of an optical compensator 308.

The microprocessor 302 is coupled to provide an output to a gain amplifier 310 which provides control signals of sufficient power to a driver 312 for the actuator 314. The actuator 314 may be one of the actuators described above and may be able to move the compensator 308 for creating sub-pixel image shifts, such as those described above.

To provide feedback control of the position of the optical compensator 308, if used, a position detector 316 may be coupled to element 308 and may be able to provide a signal indicative of optical compensator position to the processor 302. The output of position detector 316 may be provided to an amplifier 318 before that data is converted from an analog signal to a digital signal by the analog-to-digital converter (ADC) 320.

The position detector 316 may be used prior to, during or after movement of the optical compensator. For example, the position detector 316 may be polled by the super resolution processor 302 to provide current position data for the optical compensator prior. This may help the processor 302 determine an appropriate offset adjustment signal for actuator 314. The position detector 316 may also be used during movement of the optical compensator 308 as part of a feedback control to ensure that the optical compensator 308 is positioned in the predetermined position after receiving the position adjustment signal. The position detector 316 may also be used to confirm position of the optical compensator 308 before a sub-pixel offset image is captured via photodetector. Along these lines, the position detector 316 may provide an output, for example output 322, illustrated in FIG. 4, to a microprocessor controlling the photodetector, such as for example that of a digital camera.

Figure 5A:
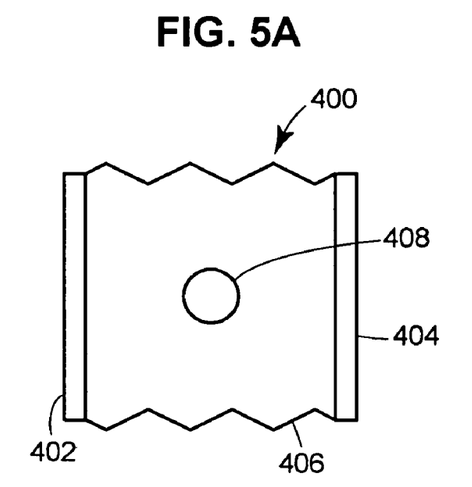
FIGS. 5A and 5B illustrate an example optical compensator.
Figure 5B:
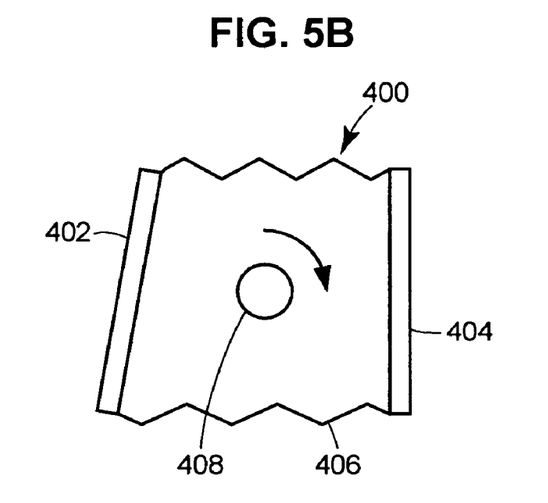
Figure 6:
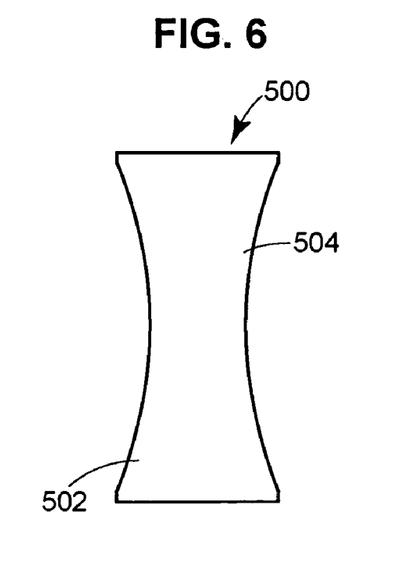
FIG. 6 illustrates another example optical compensator.

Numerous optical compensator elements will be known to persons of ordinary skill in the art and may be used in the systems described above. Example optical compensators are shown in FIGS. 5A, 5B and 6. FIGS. 5A and 5B illustrate a particular example optical compensator in the form of a variable angle prism 400. The prism 400 includes a first planar optical element 402 and a second planar optical element 404, both connected by a housing 406, in the illustrated example. Within the housing is a pivot element 408 coupled for rotational movement of at least one of the optical elements 402 or 404. As shown in the example of FIG. 5B, the optical element 402, which was parallel to optical element 404 in FIG. 5A, has been rotated about the pivot element 408 such that the optical elements 402 and 404 are no longer in parallel planes. In the illustrated configuration, angular rotation of the optical element 402 as shown will produce a walk-off or shift in the image propagating through the compensator 400. The rotation of the optical element 402 may be achieved by rotation of the pivot element 408 causing a rotation on the housing 406, with optical element 404 held in a stationary position, for example. FIGS. 5A and 5B illustrate rotation of the optical element 402 about an axis of the pivot element 408. Alternatively or additionally, the element 402 may be pivoted about axis orthogonal to the pivot element axis extending out of the illustration. In this way, the optical element 400 may achieve sub-pixel offset by what are termed tilt or pan rotation. Additionally the optical element 402 or 404 may be translated relative to the other.

Another example optical compensator is shown as a double-concave optical element 500, in FIG. 6. The element 500 includes a first concave face 502 and a second concave face 504, which are substantially identical to one another in the illustrated example, although this need not be the case. The concave face 502 may be matched with a curvature on a first optical element grouping, such as grouping 106 and sized with a numerical aperture large enough to collect image data from an object. Similar to the optical compensator 400, the optical compensator 500 may be positioned for translation, pan and/or tilt movement. The compensator 500 may be mounted on a multi-axis piezoelectric actuator, for example. The element 500 is an example of an adjustable optical element that may be adjusted linearly, angularly, or both.

Figure 7:
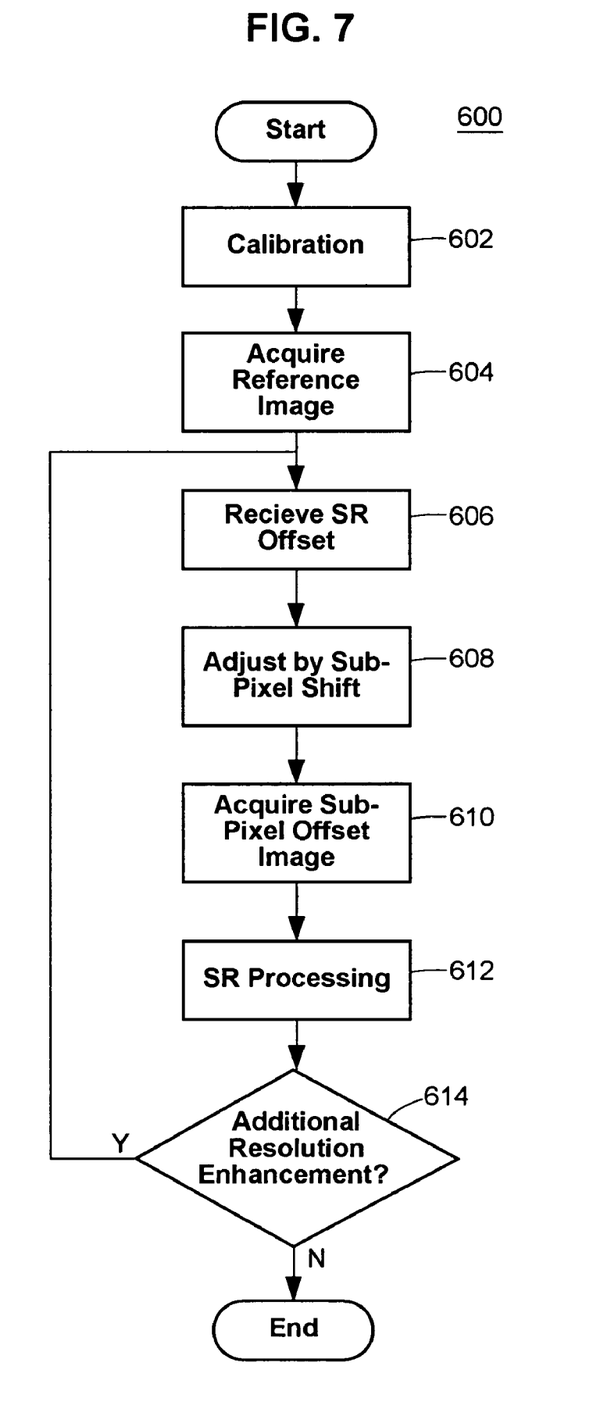
FIG. 7 illustrates a flow diagram of an example image enhancement process.

FIG. 7 illustrates an example algorithm that may be executed by the system 100 to form a super resolution image of the image 102 via the capture and analysis of one or more sub-pixel offset images. The algorithm may be executed in hole or in part by the system 124, for example.

Process 600 starts and a calibration is performed by block 602 to ensure that the system 124 is calibrated to provide accurate sub-pixel offset signals to actuator 122. For example, the block 602 may perform a mapping of the pixel space for a pixel array to a positional space for optical compensator 108. Calibration may include moving the optical compensator a calibration offset distance to produce a calibration image having a predetermined pixel separation from an initial pixel position. The block 602 may then determine a position adjustment signal that corresponds to the offset distance at the pixel array, thus deriving a sub-pixel offset signal mapping. The execution of block 602 may be performed upon initiation, yet it need not be. Instead, as an alternative, the block 602 could be executed once, and the results stored. Then, these results could later be retrieved prior to execution of the process 600 and the stored results used in lieu of re-running block 602.

After calibration, a block 604 acquires an initial reference image of the image 102, for example, by controlling a digital shutter to allow for capture of the reference image at the detector 104. The acquired reference image may be stored in a temporary and/or permanent storage medium. A block 606 receives a sub-pixel offset adjustment signal, for example, from the system 124, and that offset signal is provided to a block 608 which adjusts the optical compensator by the corresponding sub-pixel amount. After the compensator has achieved the desired sub-pixel offset adjustment, the image 102 passing through the optical compensator will be displaced a sub-pixel distance and a block 610 will acquire a sub-pixel offset. This newly captured image along with the previously captured images, such as, the reference image 604, are provided to a super resolution processor block 612 which may derive an enhanced resolution image from the captured data.

A block 614 determines whether additional increased resolution or additional sub-pixel offset images should be captured. If there is a determination that additional data is needed, then block 614 passes control back to block 606 for receipt of another sub-pixel offset adjustment signal. If no additional data is needed, then the process 600 ends. The block 614 may be responsive to indications from a user for a total number of sub-pixel offset images to be captured, for example if the user determines that a predetermined number of sub-pixel offset images are to be used for image enhancement. Alternatively, the block 614 may determine whether additional images are to be captured based upon the quality of the enhanced image from block 612 or other factors determined by the system 124.

Figure 8:
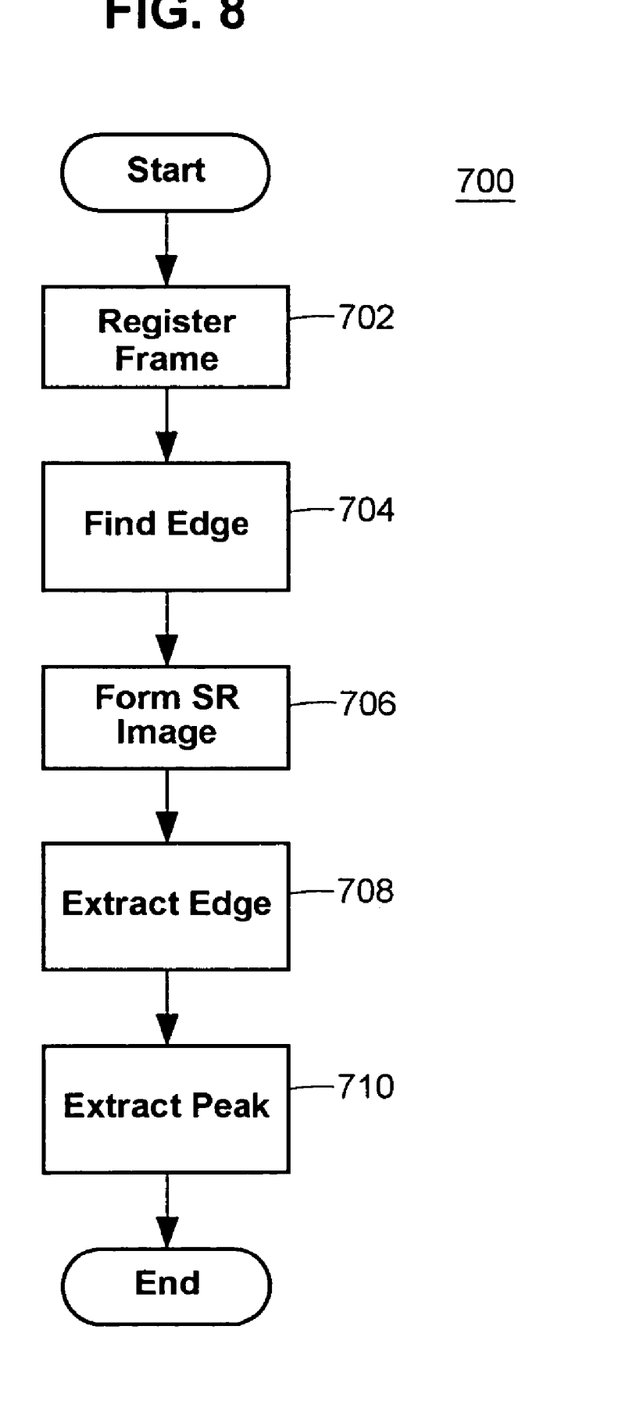
FIG. 8 illustrates a flow diagram of an example super resolution process that may be executed by the process of FIG. 7

FIG. 8 illustrates an example implementation of the super resolution process executed by block 612. The process 700 starts and a first sub-pixel offset image frame is registered at block 702. That is, position data for that sub-pixel image offset is gathered and the offset image is aligned to overlap with the reference image acquired in block 604. This alignment may occur in software where the two images are aligned in an image pixel space, for example, in an enhanced resolution image file. Alternatively, the offset image may be aligned with a previously-captured offset image or with a previously-created enhanced resolution image. A block 704 performs an edge filtering to find edges within the registered image. Various edge filters will be known to persons of ordinary skill in the art including the Sobel, Prewitt, Canny, Susan and other edge filters.

Edge detection may be performed to identify, weigh, and improve the resolution (and contrast) of high frequency data within an image, such as edge data where there is a substantial transition between image intensities. The block 704 may find a first edge within the image for enhancement with subsequently captured edges. Or alternatively, the block 704 may initially find all edges within the captured image 102 for resolution enhancement.

Once the edge or edges are found, a block 706 forms a super resolution image, for example, from the capture, registration, and analysis of one or more sub-pixel offset images and a reference image. Alternatively, the super resolution image may be created in a previous execution, for example, by block 702 during frame registration or before frame registration. In the illustrated example, a block 708 extracts the overlapping edge information from the super resolution image formed in block 706. In an example, overlapping the reference image and the sub-pixel offset image may result in a broadened edge as different pixels within the photodetector 104 capture different intensities due to the sub-pixel offsetting. Nevertheless, this overlapping edge data is extracted and, in the illustrated example, provided to a block 710, which performs peak extraction on that edge data to narrow the overlapping edge data to a peak intensity region. The block 710 may execute peak extraction algorithms to derive a peak edge intensity from the extracted edge data. In the illustrated example, the process 700 then ends. However, alternatively, if block 704 were programmed to only find one or fewer than all of the edges in the first image, then the process 700 may be modified to repeat itself until all edges within the image have been found.

In an example implementation, a 10× super resolution image may be formed by creating a storage grid with 100× the pixels of the pixel array for the photodetector, i.e., 10× the number of X-direction pixels and 10× the number of Y-direction pixels. The reference image may be populated into this grid such that it occupies every 10th pixel, and the remaining 99% of the SR image pixels remain un-occupied. As each sub-pixel shifted image is acquired, it is registered to this super resolution image storage grid and stored therein. In this manner, each subsequent image is not overlapping the reference image, but rather is occupying a separate sub-set of pixels in the SR image corresponding to the sub-pixel shift. The number of images acquired may be 1-2 times the resolution increase in images, e.g., 10-20 images may be acquired for a 10× improvement in X and Y direction resolution. After all images are acquired and registered in the super resolution image grid, 10%-20% of the image grid may be populated, unless all pixels on the pixel array of the photodetector have been observed. By blurring the super resolution image with a Gaussian kernel, the remainder of the super resolution image may be populated with a "likely" value for the un-observed pixel locations. To facilitate super resolution image formation, the super resolution image may be stored in a fast access location (like on-chip memory) although this is not necessary, as a flash card, CD-Rom, tape drive, hard disk, or other slower storage medium may be used.

Persons of ordinary skill in the art with appreciate that this is an example implementation and that other resolution increasing factors may be used and additional or fewer sub-pixel offset images captured. For example, image enhancement may be achieved by more or less than 10× resolution on the X- and Y-directions. The image capture apparatuses are not limited to a particular super resolution or enhanced resolution technique.

Figure 9:
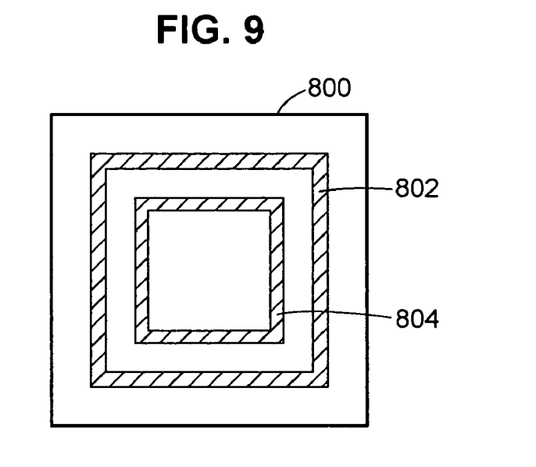
FIG. 9 illustrates an example lower resolution image.
Figure 10A:
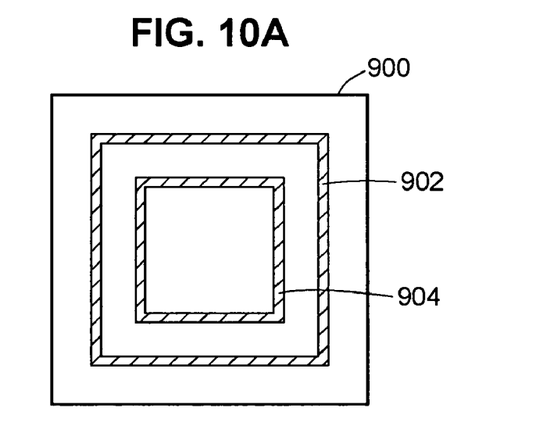
FIG. 10A illustrates an enhanced resolution image produced by the process of FIG. 7.
Figure 10B:
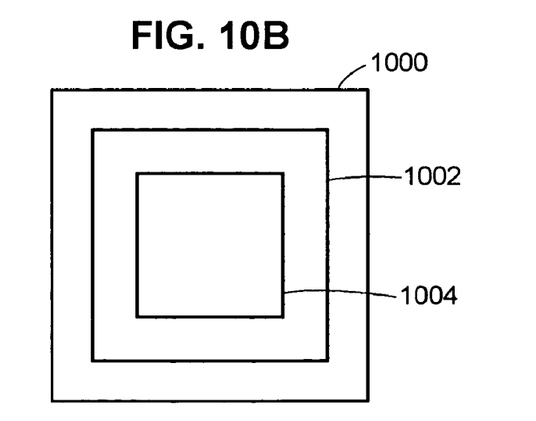
FIG. 10B illustrates a more-enhanced resolution image produced by the process of FIG. 7.

FIG. 9 illustrates an image 800 having a poor resolution. Image 800 includes a series of hard to identify concentric rectangles 802, 804 with not well defined edge boundaries (illustrated in widened and shaded form). FIGS. 10A and 10B illustrate higher resolution versions of the image 800 after enhancement by the system 100. FIG. 10A, for example, shows a higher resolution image 900 after the system 100 has taken a first number of sub-pixel offset images and compared them via the process 600 and 700 to produce the higher resolution image. In the illustrated example, concentric rectangles 902 and 904 have better resolution than corresponding rectangles 802 and 804 of the original image of FIG. 9. Merely by way of example, the FIG. 10A may represent an image enhancement procedure wherein five offset images have been captured and used for image resolution.

FIG. 10B illustrates an image 1000 after a larger number of sub-pixel offset images have been taken and processed for image resolution. The image illustrates two higher-resolution concentric rectangles 1002 and 1004 each with better edge resolution than that of the corresponding rectangles illustrated in FIGS. 9 and 10A. The image 1000 may be formed, for example, by capturing twenty sub-pixel offset images for enhancement via algorithm 600 and 700.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of enhancing resolution of an image, the method comprising:

providing a photodetector;

capturing a first image at a first pixel position on the photodetector;

integrating a signal from a vibration sensor to determine image shift due to motion of an optical element;

calculating an amount of offset for an optical compensator to shift the first image a predetermined sub-pixel amount including the image shift due to the motion of the optical element;

providing a sub-pixel offset signal to the optical compensator in the calculated amount of the offset;

moving the optical compensator to form at least one additional image at a second pixel position offset from the first pixel position by a sub-pixel offset distance;

capturing the at least one additional image;

comparing the first image to the at least one additional image;

in response to the comparison of the first image and the at least one additional image, deriving an enhanced resolution image; and identifying an edge in the enhanced resolution image, the edge having varying intensities based on the comparison of the first image and the at least one additional image;

determining a region of peak intensity for the edge of the enhanced resolution image; and in response to the determination of the region of peak intensity, enhancing a resolution of the edge by narrowing the edge to the peak intensity region.

2. The method of claim 1, further comprising moving the optical compensator to form the at least one additional image at the second pixel position offset from the first pixel position by a distance equal to or less than approximately 1/10 of a pixel on the photodetector.

3. The method of claim 2, wherein the distance is equal to or less than approximately 1/100 of the pixel.

4. The method of claim 1, further comprising:
forming the enhanced resolution image to have a 10× resolution enhancement in each orthogonal direction of the enhanced resolution image.

5. An article comprising a machine-accessible medium having stored thereon instructions that, when executed by a machine, cause the machine to:

capture a first image at a first pixel position;

integrate a signal from a vibration sensor;

provide a sub-pixel offset signal to an optical compensator based on a requested image shift and an amount of image shift calculated from the vibration sensor;

move the optical compensator to form at least one additional image at a second pixel position offset from the first pixel position by a sub-pixel offset distance;

capture the at least one additional image;

compare the first image to the at least one additional image;

in response to a comparison of the first image and the at least one additional image, derive an enhanced resolution image;

identify an edge in the enhanced resolution image, the edge having varying intensities based on the comparison of the first image and the at least one additional image;

determine a region of peak intensity for the edge of the enhanced resolution image; and in response to the determination of the region of peak intensity, enhance a resolution of the edge by narrowing the edge to the peak intensity region.

6. The article of claim 5, having further instructions that when executed by the machine, cause the machine to create the enhanced resolution image having a 10× resolution enhancement in each orthogonal direction of the enhanced resolution image.

7. The article of claim 5, having further instructions that when executed by the machine, cause the machine to apply a Sobel, Prewitt, Canny, or SUSAN filter to identify the edge.

8. The article of claim 5, having further instructions that when executed by the machine, cause the machine to calibrate the optical compensator.

9. The article of claim 8, having further instructions that when executed by the machine, cause the machine to:

move the optical compensator an offset distance to produce a calibration image at a calibrated offset position, having a predetermined pixel separation from the first pixel position;

determining a position adjustment signal corresponding to the offset distance; and deriving a sub-pixel offset signal mapping.

10. The article of claim 5, having further instructions that when executed by the machine, cause the machine to register the first image and the at least one additional image.

11. The article of claim 5, having further instructions that when executed by the machine, cause the machine to move the optical compensator to form the at least one additional image at the second pixel position offset from the first pixel position by a distance equal to or less than approximately 1/10 of a pixel on a pixel array.

12. The article of claim 5, having further instructions that when executed by the machine, cause the machine to move the optical compensator to form the at least one additional image at the second pixel position offset from the first pixel position by a distance equal to or less than approximately 1/100 of a pixel on a pixel array.

* * * * *